US011970256B1

(12) United States Patent
Sauder, II et al.

(10) Patent No.: US 11,970,256 B1
(45) Date of Patent: Apr. 30, 2024

(54) SEARCH AND RESCUE DEVICE AND METHODS OF USING THE SAME

(71) Applicant: Government of the United States, as represented by the Secretary of the Air Force, Wright-Patterson AFB, OH (US)

(72) Inventors: Gene David Sauder, II, Okinawa (JP); Bon Strout, Satellite Beach, FL (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 294 days.

(21) Appl. No.: 17/501,009

(22) Filed: Oct. 14, 2021

Related U.S. Application Data

(60) Provisional application No. 63/114,119, filed on Nov. 16, 2020.

(51) Int. Cl.
  *B63C 9/20* (2006.01)
  *B63B 22/00* (2006.01)
  (Continued)

(52) U.S. Cl.
  CPC ............... *B63C 9/20* (2013.01); *B63C 9/01* (2013.01); *B63C 9/02* (2013.01); *G01W 1/08* (2013.01);
  (Continued)

(58) Field of Classification Search
  CPC .... B63C 9/20; B63C 9/01; B63C 9/02; B63C 2009/0017; B63B 79/15; B63B 22/003; B63B 2022/006; G01W 1/08
  See application file for complete search history.

(56) References Cited

U.S. PATENT DOCUMENTS

| 7,695,335 B2 | 4/2010 | Ricciutti et al. |
| 9,435,892 B2 | 9/2016 | O'Regan et al. |

(Continued)

OTHER PUBLICATIONS

Kinetic Technology International (KTI), SAR Datum rescue positioning beacons, published on the internet at https://kti.com.au/sar-datum-buoy/#pdf by Kinetic Technology International, Melbourne, Australia 2019.

(Continued)

*Primary Examiner* — Andrew Polay
(74) *Attorney, Agent, or Firm* — AFMCLO/JAZ; Jeffrey V. Bamber

(57) ABSTRACT

An air deployable buoyant device for transmitting data on its location and the conditions in the air as it descends to the surface of a body of water, and on conditions on a body of water on a real-time basis is disclosed. The device includes a buoy and a plurality of sensors and a transmitter associated with the buoy. The transmitter transmits data on the location of the device and the conditions in the air and on a body of water on a real-time basis to at least one receiver. The receiver may be located over the horizon or in line of sight with the device. The sensors are in communication with the transmitter, and each sensor measures at least one condition in the air and/or on a body of water to assist in locating a person in the water and provide information on the water conditions to a rescue team. Methods of deploying and using the buoyant device are also disclosed herein.

7 Claims, 2 Drawing Sheets

(51) Int. Cl.
  *B63C 9/01* (2006.01)
  *B63C 9/02* (2006.01)
  *G01W 1/08* (2006.01)
  *B63C 9/00* (2006.01)

(52) U.S. Cl.
  CPC . *B63B 2022/006* (2013.01); *B63C 2009/0017* (2013.01)

(56) References Cited

U.S. PATENT DOCUMENTS

| | | |
|---|---|---|
| 9,709,396 B2 | 7/2017 | Chedrawy et al. |
| 10,697,777 B1 * | 6/2020 | Robertson ............ G01C 21/203 |
| 10,775,532 B2 | 9/2020 | MacArthur et al. |
| 2015/0027220 A1 * | 1/2015 | Halfon .................. G01C 17/00 73/170.11 |
| 2021/0215518 A1 * | 7/2021 | Rufo ........................ G06F 8/61 |

OTHER PUBLICATIONS

Victoria Futch and Arthur Allen, Search and Rescue Applications: On the Need to Improve Ocean Observing Data Systems in Offshore or Remote Locations, Frontiers in Marine Science, Jun. 6, 2019, published on the internet at https://www.frontiersin.org/articles/10.3389/fmars.2019.00301/full.

* cited by examiner

US 11,970,256 B1

SEARCH AND RESCUE DEVICE AND METHODS OF USING THE SAME

Pursuant to 37 C.F.R. § 1.78(a)(4), this application claims the benefit of and priority to prior filed Provisional Application Ser. No. 63/114,119 filed Nov. 16, 2020, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to devices for use in water search and rescue operations and, more particularly, to a search and rescue device that transmits information on its location and conditions in the air as it descends to the surface of a body of water and on water conditions when it is on the surface of a body of water.

BACKGROUND OF THE INVENTION

Successful Search and Rescue (SAR) operations are contingent on rescue task forces receiving accurate and timely data. The first two phases (report and locate) are key to increasing the odds of rescuing the Isolated Personnel (IP) fighting for their survival. Once a report of the IP is received by a rescue coordination center, the task force begins looking for data that will identify the exact position and or a general location of the IP. For the open ocean environment, the task force will use modeling and simulation software to predict the location of the IP. This software solution provides a drift model to determine where the IP will be located throughout the search operation.

These drift models can be accurate in the first 12 hours. However, as search operations continue, the models become exponentially less reliable due to the built-in error. With a lack of local environmental data, the software used currently for search and rescue will generate a model with a larger recommended search area to account for all the unknown variables. This negatively affects search operations by increasing the area needed to be combed over with finite resources; directly decreasing the probability of locating the IP. This is similar to hurricane prediction models and why it is difficult to predict the track of the storm. The more time variable is plugged into the software, the more erratic the model becomes. Leeward drift of a man in the water versus a 20 man life raft can have a 180 degree departure from one another. This condition can happen if winds and current are going in opposite directions. One is affected by wind or current based on its profile relative to the surface of the water. A man in the water will travel more with current versus a raft with a high profile. The higher profile will have a more exposed surface area to the surface winds and will generally travel with the wind. This condition changes variably with the addition of a sea anchor and low winds.

Not having real time sea state also adversely affects the rescue team. Should the IP and/or debris be located by the search party, the rescue team will potentially have to enter the water. Entering the open ocean has risk associated, such as wave height, surface winds, water temperature, and current speed. These conditions can be very difficult to predict in the open ocean environment. The forecasted models are what the rescue team currently has to rely on to assess these risks, which does not provide reliable real-time data at the location of the isolated person.

A need, therefore, exists for improved devices and methods to assist in locating a person on a body of water, and that are also able to provide information on the air and water conditions to a rescue team.

SUMMARY OF THE INVENTION

While the invention will be described in connection with certain embodiments, it will be understood that the invention is not limited to these embodiments. To the contrary, this invention includes all alternatives, modifications, and equivalents as may be included within the spirit and scope of the present invention.

The present invention provides devices for use in water search and rescue operations and, more particularly, to a search and rescue device that transmits information on its location and conditions in the air as it descends to the surface of a body of water and on water conditions when it is on the surface of a body of water.

In one embodiment of the present invention, an air deployable buoyant device for transmitting data on its location and the conditions in the air as it descends to the surface of a body of water and conditions on the surface of a body of water on a real-time basis is provided. The device includes a buoy, a plurality of sensors, and a transmitter associated with the buoy. Each sensor measures at least one local condition in the air or on a body of water. The sensors are in communication with the transmitter. The transmitter transmits data on the conditions on a body of water on a real-time basis to at least one receiver. The data may be used to assist in locating a person in the water and provide information on the atmospheric and/or water conditions to a rescue team. The receiver may be located over the horizon or in line of sight with the device.

Methods of locating a person on a body of water and providing information on the atmospheric and water conditions for pararescue personnel to rescue a person on a body of water are also provided.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The present invention provides devices for use in water search and rescue operations and, more particularly, to an air deployable search and rescue device that transmits information on its location and conditions in the air as it descends to the surface of a body of water and on water conditions when it is on the surface of a body of water. The search and rescue device may be referred to as the Resilard Drift Beacon in honor of Jahmar Resilard, a U.S. Marine Corps pilot.

Figure 1:
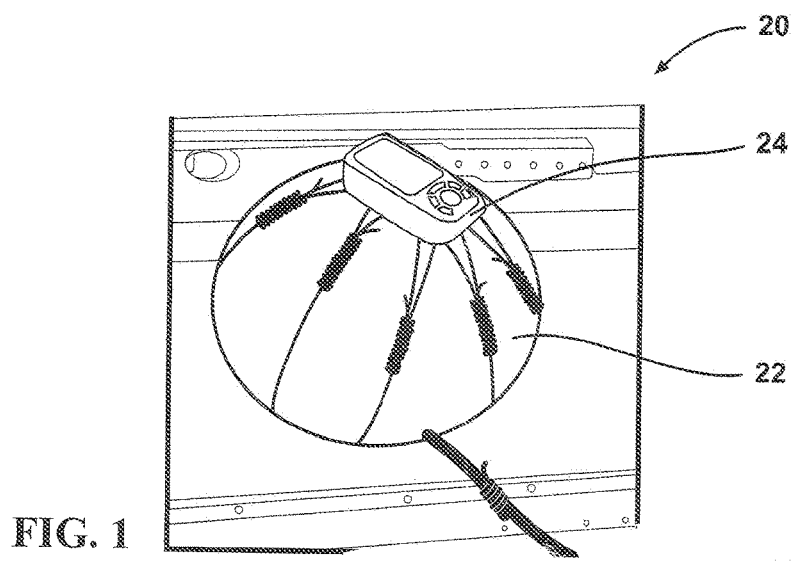
FIG. 1 is a perspective view of one embodiment of the search and rescue device.

In one embodiment of the present invention, an air deployable buoyant device 20 is provided for transmitting data on its location and atmospheric conditions as it falls through the air, and on its location and the conditions on a body of water on a real-time basis. The buoyant device 20 comprises a buoy 22, a plurality of sensors, and a transmitter associated with the buoy 22. In the embodiment shown in FIGS. 1-3, the sensors and the transmitter are included in a single instrument 24. The buoyant device 20 may be provided with a weight (such as a weighted bag) 26 joined thereto. A parachute 28 within a container may be joined to the device 20 and/or the weight 26. It should be understood all portions or components associated with the buoyant device 20 need not be buoyant. For example, the weight 26 will not be buoyant. It should also be understood that while the buoyant device 20 is air deployable, it can also be deployed by a ship, or watercraft.

The buoy 22 is typically waterproof and can comprise any type of buoyant structure that is suitable for being air deployed and for holding the sensors and transmitter. The buoy 22 may be of any suitable size and shape. In the embodiment shown in the drawings, the buoy is spherical. The instrument 24 comprising the sensors and transmitter can be joined to the buoy 22 in any suitable manner. In the embodiment shown in the drawings, the instrument 24 is joined to the outside of the buoy 22 with a cord 25, such as a paracord known as a 550-cord. In other embodiments, the buoy 22 can comprise a housing having an interior that contains one or more of the sensors, and/or the transmitter or portions thereof, and/or other components such as power sources. When it is said that the transmitter and sensors are "associated with" the buoy 22, that includes any of these configurations. Of course, if one or more of components are located inside a housing, an access panel can be provided on the buoy.

The sensors can comprise one or more of the following: a global positioning system (GPS) device or unit, an anemometer, an accelerometer, an altimeter, a barometer, and a thermometer. Typically, two or more of these sensors will be provided.

The GPS device can comprise any suitable GPS device. In the embodiment shown in the drawings, the GPS device is a commercial GARMIN® INREACH EXPLORER®+GPS device available from www.garmin.com. This device comprises a GPS unit; an altimeter that is capable of measuring barometric pressure (and thus functioning as a barometer); and an accelerometer. It can be configured to add an anemometer and a solar charger as peripheral devices. The GPS feature of this device is primarily used to measure drift. The buoyant device 20 is air deployable, and will typically be deployed using a parachute. There are two drift profiles that the GPS device can measure—parachute drift and water (e.g., ocean) drift.

Figure 2:
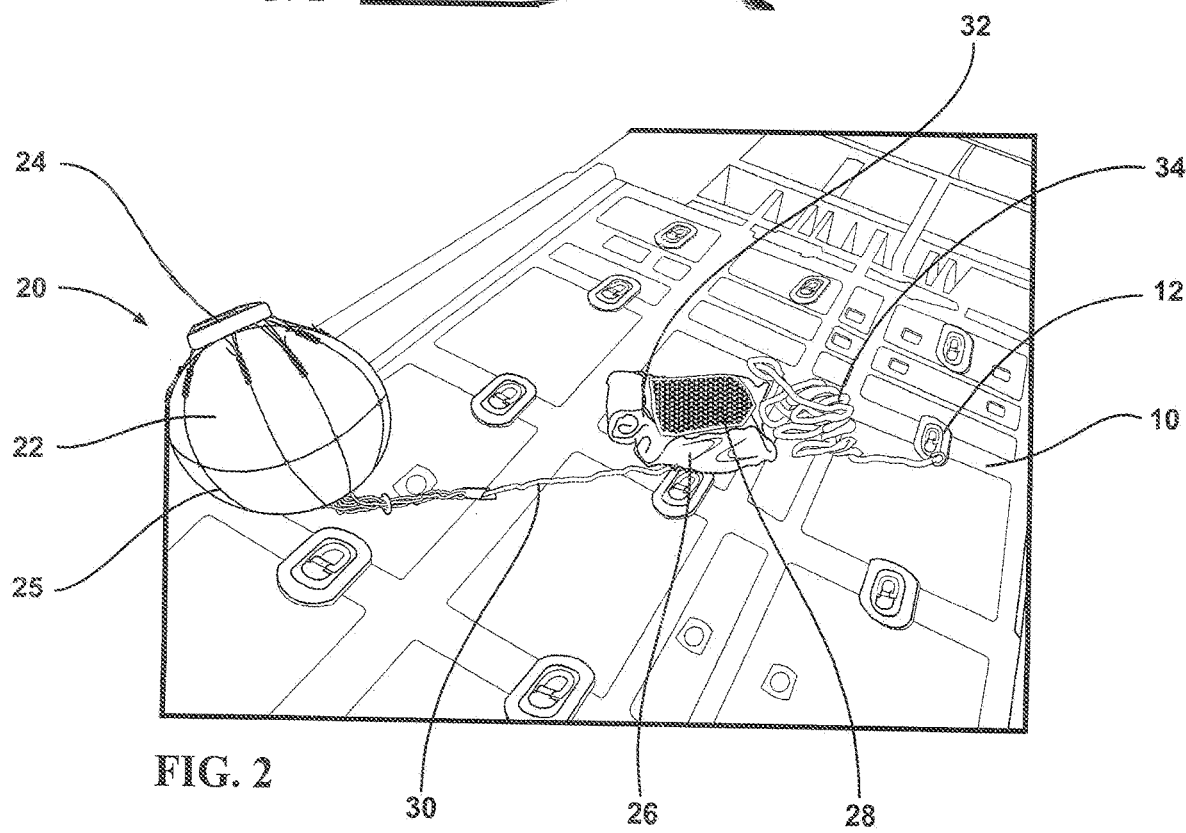
FIG. 2 is a perspective view of the search and rescue device with a parachute for deploying the same.

Parachute drift is the speed and direction that the canopy of the parachute descends from altitude due to wind velocity. FIG. 2 shows that the buoyant device 20 may be deployed out the paratroop door or the ramp of a cargo aircraft. After it is physically thrown out of the aircraft, it is desirable for the speed (velocity) or (V) and direction of the device to be measured at least at every 1,000 feet of drop in altitude. The GARMIN® device is capable of measuring speed and direction every 100 feet, or smaller intervals, of drop in altitude as it descends to the surface of the water. The recorded wind velocity may then be transmitted line of site (LOS) and over the horizon (OTH) to be received by the recovery team. This recorded data is used in the following equation to determine the release point when pararescuers jump out of the plane. Drift (D)=Constant (K)×Altitude (A)×Velocity (V) or D=KAV. The Constant (K) is the performance specification of a parachute. The wind velocity data is input into the ANDROID™ Tactical Assault Kit (ATAK) worn by the Jump Master that is flying overhead prepping to jump out of the aircraft. The ATAK is an ANDROID™ smartphone geospatial infrastructure and military situational awareness application that was developed by the Air Force Research Laboratory.

Once the buoyant device 20 is on the surface of the water, the GPS unit can be used determine water (e.g., ocean) drift by reporting its position data LOS and OTH. The buoyant device 20 can measure and transmit its position at more frequent time intervals when it first lands on the surface of the water, and then at increased time intervals thereafter. For example, the buoyant device 20 can report its position at first intervals (e.g., every 60 seconds) during a first time period (e.g., for the first 10 minutes) to determine the velocity of the ocean current. The position can be reported during a second (and subsequent time periods) at more increased time intervals. For example, after ten minutes, the position can be reported every 10 minutes for the next 12 hrs. The position can thereafter be reported every minutes until the unit is recovered. The reported velocity of the buoyant device 20 can be transmitted to the U.S. Coast Guard Search and Rescue Optimal Planning System (SAROPS) computer program. The reported velocities will be real time allowing for validation and improvement of the SAROPS prediction.

As the buoyant device 20 remains on the water, the anemometer can be used to measure wind speed and direction. Wind speed and wave height are important factors in whether it is safe for a parachutist to land in a particular area. This data can be sent LOS to the rescue jump team in order to determine if surface winds are within safe parameters. The measurement data can be sent OTH to be combined with GPS data to increase the accuracy of the drift model.

The altimeter can be used to measure changes in altitude as the device drops to the surface of the water. The altimeter (that is, the barometer feature thereof) can also be used to measure pressure at the surface of the water. The transmitter can transmit this data LOS back to the Jump Master. This data can be used to arm a parachutist's Emergency Parachute Automatic Activation Device. This latter device sets a reserve parachute to open at a particular altitude in the event that the main parachute is not opened for reasons such as loss of consciousness of the parachutist. The altimeter can also be used to measure wave height. The altimeter can send back maximum and minimum pressure LOS to the ATAK. The ATAK can process the data and display current wave height. The wave height can also be sent OTH to be used in the drift model.

The accelerometer can be used to measure wave height in addition to wave motion. This data can be sent OTH to be use in the drift model.

The thermometer can be used to measure air and/or water temperature. The buoyant device 20 can comprise more than one thermometer. One thermometer can be placed in the water and one can be placed above the waterline to measure air temperature.

The transmitter can be any suitable type of device that is capable of transmitting the data collected by the sensors to a receiver. The sensors are in communication with the transmitter. In some cases, the transmitter can be in the form of a transceiver. The transmitter transmits data on the conditions in the air as the buoyant device 20 descends to the surface of a body of water, and while the buoyant device 20 is on the body of water on a real-time basis to at least one receiver. The receiver may be located over the horizon and/or in line of sight with the device. The data can, thus, be sent to two places for different uses: over the horizon (OTH) for modeling and simulation, and line of sight to the recovery team. In the embodiment shown in the drawings, the GARMIN® GPS device sends its information to a Garmin website that can be tracked by using a computer.

Figure 3:
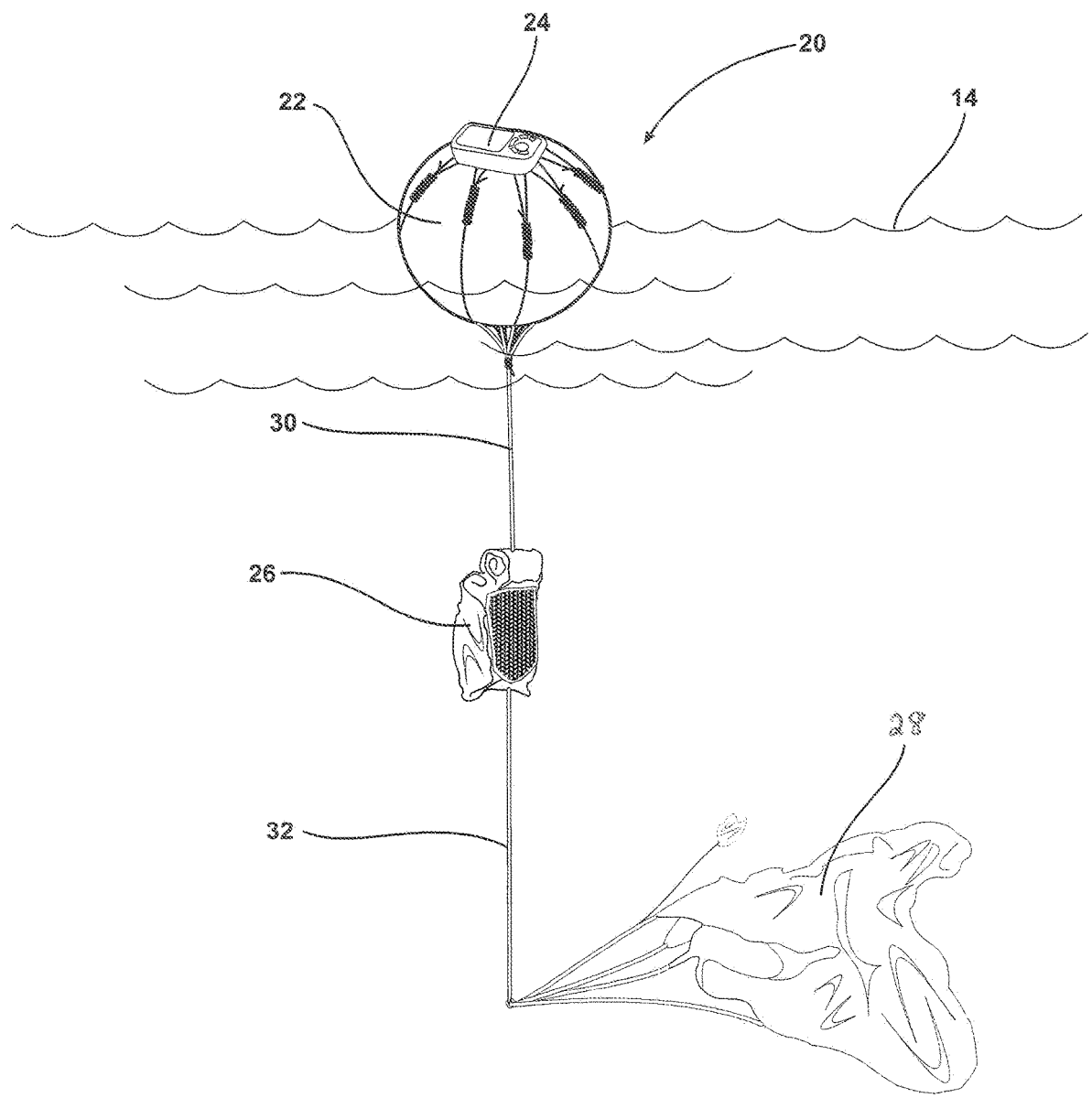
FIG. 3 is a perspective view of the search and rescue device floating on the ocean and the weighted bag and sea anchor below the surface of the water.

The weight (such as a weighted bag) 26 joined to the buoy 22 can be used to stabilize the buoy 22 when in the water so that all or portions of the sensors and the transmitter are disposed above the surface of the water. The weight 26 can comprise any suitable type of weight. In the embodiment shown in the drawings, the weight 26 is provided in the form of a 15 lb. weighted sand bag known as a Standard Airdrop Training Bundle (or SATB). The weight 26 can be joined to the buoy 22 in any suitable manner. In the embodiment shown in the drawings the weight 26 is joined by a cord 30 that is joined to the spherical buoy 22 on the opposite side of the buoy as the electronics. In one embodiment, the cord 30 may be about four feet long. When the buoy 22 is on the surface of the water, the weighted bag 26 is located below the surface of the water as shown in FIG. 3. In other embodiments, other ways of providing ballast can be used instead of the SATB. For example, additional weight can be added directly to the inside or outside of the portion of the buoy 22 that is opposite the electronics.

A parachute 28 may be joined to the buoyant device 20 and/or to the weight 26. The parachute 28 may be in a container or a compartment. The parachute 28 may serve one or more purposes. The parachute 28, as discussed above, may be used during the air deployment of the buoyant device 20 to ensure that the buoyant device 20 is not damaged when it is dropped from an aircraft. In addition, the parachute 28 may be used as a sea anchor when the buoyant device 20 is on the surface of the water. The parachute 28 may be joined to the buoyant device 20 and/or to the weight 26 by any suitable type of connecting structure. In the embodiment shown in FIG. 2, the parachute 28 is in a compartment on top of the weighted bag 26, and is joined to the weight (SATB) 26 by a cord 32.

The compartment for the parachute 28 on the weighted bag 26 may be joined by a strap or cord 34 to the airframe of the aircraft. The compartment for the parachute 28 may be separable from the weighted bag 26 to allow the device 20, the weighted bag 26, and the parachute 28 to be deployed from the airframe. To deploy the device 20, the buoy 22 may be held by a person in one hand and the weighted bag 26 can be held in their other hand, and both can be tossed out of the aircraft at the same time. When this happens, the parachute 28 will be pulled out of the compartment, and the parachute 28 will open outside of the aircraft and the weighted bag 26 and device 20 will descend to the surface of the water under the parachute 28.

In some embodiments, at least a portion of the connecting structure to the parachute 28 may be configured to provide a water activated release (e.g., by explosives, a water soluble membrane, or a timer) so that the parachute 28 separates from the buoy 22 or weight 26 after reaching the surface of the water. For example, at least a portion of the cord 32, or a connection (e.g., a connector) between the cord 32 and the buoy 22, the weight 26, or the parachute 28, can be water soluble. Another example of a water activated release mechanism is a sea water-activate electro-explosive release system, such as the Payload Parachute Release System Model 1814-028 manufactured by Cobham Mission Systems, Davenport, IA, U.S.A.

In the embodiment shown in FIG. 3, when used as a sea anchor, the parachute 28 may be located below the surface of the water underneath the weighted bag 26. When the buoyant device 20 is in the water with the weight 26 underneath without a sea anchor, the buoyant device 20 will be moved by the water current similarly to a person in the water without a life raft. On the other hand, when the parachute 28 is used as a sea anchor, this can be used to simulate how a person in a life raft will be carried by the current.

The present invention also comprises methods of using one or more of the buoyant devices described herein. In the most basic form, the method comprises deploying the air deployable buoyant device 20 into a body of water from an aircraft or water vessel. If the buoyant device 20 is deployed from an aircraft, the device measures and transmits information on conditions in the air as it descends to the surface of a body of water and on water conditions when it is on the surface of a body of water. In some cases, a single deployable buoyant device 20 can be dropped in the last known location of the person or object that is the subject of the search.

In other cases, when it is not known whether the isolated person is in a life raft, two of the deployable buoyant devices 20 can be dropped in such a location. The first buoyant device may have a water activated release connection with its parachute 28 that releases the parachute after it reaches the water, and the second buoyant device retains its parachute for use as a sea anchor. The first buoyant device will be used to approximate the movement of a person in the water without a life raft, and the second buoyant device will be used to approximate the movement of a person in the water with a life raft.

Any number of deployable buoyant devices 20 can be used in a search and rescue effort. For example, in other embodiments, if it is desired to search a particular area or grid of a body of water, a deployable buoyant device 20 can be dropped in each corner (or other boundary location) of the grid. This technique can be used to avoid searching the same area multiple times if the ocean drift has shifted the grid to a different location. In addition, once an isolated person has been located, another deployable buoyant device 20 can be deployed by the rescue team in the location of the IP enabling the team to gather real time data on whether the conditions are present to safely conduct the rescue.

The system and method described herein can provide a number of advantages. It should be understood, however, that these advantages need not be required unless they are set forth in the appended claims. The present invention is capable of providing, in a single device, the information that previously required two separate devices to provide: a dropsonde and a drifter buoy. The device can collect the environmental data necessary to increase the accuracy of the drift models and provide actionable data to the rescue team. The device can provide a real-time drift pattern that will then be utilized by all search and rescue parties to narrow the search pattern. The present invention enhances the search and rescue team's ability to assess the situation that the team is about to jump into while delivering a more specific search radius for the search party. The reduced search radius will reduce flight hours, and also reduce the isolated person's time in isolation. The device and method described herein have the potential to save large amounts of money in search and rescue operations, but more importantly, to increase the chances of rescuing isolated personnel before they perish.

The term "associated with", as used herein, includes configurations in which a second component is joined to a first component, as well as configurations in which a second component is enclosed within a first component. The term "associated with" also includes configurations in which a portion of a second component is enclosed within a first component and a portion of the second component lies outside of the enclosure provided by the first component.

The terms "join" and "joined", as used herein, encompass configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element. The term "joined" includes both those configurations in which an element is temporarily joined to another element, or in which an element is permanently joined to another element.

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An air deployable buoyant device for collecting and transmitting data on its location and the conditions in the air and on a body of water on a real-time basis, said device comprising:
    a buoy;
    a plurality of sensors associated with said buoy, wherein said sensors measure at least one condition in the air as said device is falling to the surface of a body of water, and at least one condition on the surface of a body of water, said sensors comprising two or more of the following:
      a GPS unit;
      an anemometer;
      an accelerometer;
      an altimeter;
      a barometer; and
      a thermometer;
    a transmitter associated with said buoy, said transmitter being in communication with said sensors, and adapted to transmit data on the location of the device and the conditions in the air as said device is falling to the surface of a body of water, and on the surface of a body of water on a real-time basis to at least one receiver, which receiver is located over the horizon or in line of sight with the device; and
    a parachute and a connecting structure for joining said parachute to said buoy, wherein said parachute is deployable as said buoyant device is falling to the surface of a body of water, and after the buoyant device reaches the surface of the water, the parachute serves as a sea anchor.

2. A method of providing information on the location of a device and conditions in the air and on the body of water for rescue personnel, said method comprising:
    (a) deploying by air drop over a body of water, a device for collecting and transmitting data on the conditions in the air and on the body of water, said device comprising: a buoy; a parachute joined to said buoy with a connecting structure, and said parachute is deployed during the air drop; a plurality of sensors associated with said buoy, wherein said sensors measure at least one condition in the air as said device is falling to the surface of a body of water, and at least one local condition on a body of water, said sensors comprising at least two of the following: a GPS device; an accelerometer; an altimeter; a barometer; and a thermometer; and a transmitter associated with said buoy, said transmitter being in communication with said sensors, and adapted to transmit data on the location of the device and the conditions in the air and on a body of water on a real-time basis to at least one receiver, which receiver is located over the horizon or in line of sight with the device;
    (b) measuring with the device, the wind direction and velocity at preselected intervals during the descent of said device during its air drop, and transmitting the data on wind direction and velocity to a receiver; and
    (c) when the device is on the surface of the water, measuring with the device and collecting data on: the location of the device; the wind speed and direction above the body of water; atmospheric pressure above the body of water; wave height and wave motion, and transmitting the data collected to a receiver, wherein the location of the device is measured and initially transmitted at first intervals during a first time period after the device reaches the surface of the water, and is measured and transmitted at increased time intervals after the first time period.

3. The method of claim 2 wherein a weight is joined to said buoy, wherein said weight is joined to the buoy in a manner so that the weight sinks below the surface of the water and is disposed underneath the buoy when the buoy is on the surface of the water.

4. A method of providing information on the location of a device and conditions in the air and on the body of water for rescue personnel, said method comprising:
   (a) deploying by air drop over a body of water, a device for collecting and transmitting data on the conditions in the air and on the body of water, said device comprising: a spherical buoy having an outside surface; a weight joined to said buoy; a parachute joined to said buoy with a connecting structure, wherein said parachute is deployed during the air drop; a plurality of sensors associated with said buoy, wherein said sensors measure at least one condition in the air as said device is falling to the surface of a body of water, and at least one local condition on a body of water, said sensors comprising at least two of the following: a GPS device; an accelerometer; an altimeter; a barometer; and a thermometer; and a transmitter associated with said buoy, said transmitter being in communication with said sensors, and adapted to transmit data on the location of the device and the conditions in the air and on a body of water on a real-time basis to at least one receiver, which receiver is located over the horizon or in line of sight with the device;
   (b) measuring with the device, the wind direction and velocity at preselected intervals during the descent of said device during its air drop, and transmitting the data on wind direction and velocity to a receiver; and
   (c) when the device is on the surface of the water said weight is joined to said buoy in a manner so that the weight sinks below the surface of the water and is disposed underneath the buoy when the buoy is on the surface of the water, and at least portions of said sensors and said transmitter are located on a first portion of the outside surface of the buoy, and said weight is joined to the buoy so that it extends below a second portion of the outside surface of the buoy opposite the sensors and said transmitter so that the weight keeps the sensors and transmitter upright and above the surface of the water, and measuring with the device and collecting data on: the location of the device; the wind speed and direction above the body of water; atmospheric pressure above the body of water; wave height and wave motion, and transmitting the data collected to a receiver.

5. The method of claim 4 wherein the connecting structure between the buoy and the parachute is released, and the weight is configured so that the buoy and weight will approximate the movement of a person on a body of water without a life raft.

6. A method of providing information on the location of a device and conditions in the air and on the body of water for rescue personnel, said method comprising:
   (a) deploying by air drop over a body of water, a device for collecting and transmitting data on the conditions in the air and on the body of water, said device comprising: a buoy; a weight joined to said buoy; a parachute joined to said buoy with a connecting structure, and said parachute is deployed during the air drop; a plurality of sensors associated with said buoy, wherein said sensors measure at least one condition in the air as said device is falling to the surface of a body of water, and at least one local condition on a body of water, said sensors comprising at least two of the following: a GPS device; an accelerometer; an altimeter; a barometer; and a thermometer; and a transmitter associated with said buoy, said transmitter being in communication with said sensors, and adapted to transmit data on the location of the device and the conditions in the air and on a body of water on a real-time basis to at least one receiver, which receiver is located over the horizon or in line of sight with the device;
   (b) measuring with the device, the wind direction and velocity at preselected intervals during the descent of said device during its air drop, and transmitting the data on wind direction and velocity to a receiver; and
   (c) when the device is on the surface of the water said weight is joined to said buoy in a manner so that the weight sinks below the surface of the water and is disposed underneath the buoy when the buoy is on the surface of the water, and measuring with the device and collecting data on: the location of the device; the wind speed and direction above the body of water; atmospheric pressure above the body of water; wave height and wave motion, and transmitting the data collected to a receiver, wherein said parachute functions as a sea anchor when said device is on the surface of the water, and the buoy, weight, and sea anchor will approximate the movement of a person on a body of water in a life raft.

7. A method of providing information on the location of a device and conditions in the air and on the body of water for rescue personnel, said method comprising:
   (a) deploying by air drop over a body of water, a first device for collecting and transmitting data on the conditions in the air and on the body of water, said first device comprising: a buoy; a weight joined to said buoy; a parachute joined to said buoy with a connecting structure, and said parachute is deployed during the air drop, and the first device is configured so that the connection between the buoy and the parachute is released and the weight is configured so that the buoy and weight will approximate the movement of a person on a body of water without a life raft; and a plurality of sensors associated with said buoy, wherein said sensors measure at least one local condition on a body of water, said sensors comprising at least two of the following: a GPS device; an accelerometer; an altimeter; a barometer; and a thermometer; and a transmitter associated with said buoy, said transmitter being in communication with said sensors, and adapted to transmit data on the location of the device and the conditions in the air and on a body of water on a real-time basis to at least one receiver, which receiver is located over the horizon or in line of sight with the device;
   (b) measuring with the device, the wind direction and velocity at preselected intervals during the descent of said device during its air drop, and transmitting the data on wind direction and velocity to a receiver;
   (c) when the device is on the surface of the water, measuring with the device and collecting data on: the location of the device; the wind speed and direction above the body of water; atmospheric pressure above the body of water; wave height and wave motion, and transmitting the data collected to a receiver; and
   (d) said method further comprises deploying by air drop over the body of water, a second device for collecting and transmitting data on the conditions in the air and on the body of water, said second device also comprising a parachute wherein said parachute functions as a sea anchor when said second device is on the surface of the water, and the buoy, weight, and sea anchor will approximate the movement of a person on a body of water in a life raft.

* * * * *